(12) United States Patent
Breitman

(10) Patent No.: US 10,275,746 B1
(45) Date of Patent: Apr. 30, 2019

(54) REMOTE CONTROLLED WASHER, DRYER, LAUNDRY PRODUCT DISPENSER AND PAYMENT SYSTEM AND OPERATING METHOD THEREOF

(71) Applicant: Randy Breitman, Raritan, NJ (US)

(72) Inventor: Randy Breitman, Raritan, NJ (US)

( * ) Notice: Subject to any disclaimer, the term of this patent is extended or adjusted under 35 U.S.C. 154(b) by 170 days.

(21) Appl. No.: 15/731,460

(22) Filed: Jun. 12, 2017

(51) Int. Cl.
| | |
|---|---|
| *G08B 21/00* | (2006.01) |
| *G06Q 20/10* | (2012.01) |
| *D06F 33/02* | (2006.01) |
| *G06F 3/048* | (2013.01) |
| *H04L 29/08* | (2006.01) |

(52) U.S. Cl.
CPC .......... *G06Q 20/102* (2013.01); *D06F 33/02* (2013.01); *G06F 3/048* (2013.01); *H04L 67/306* (2013.01)

(58) Field of Classification Search
CPC ....... G06Q 20/102; D06F 33/02; G06F 3/048; H04L 67/306
USPC ......................................................... 340/3.3
See application file for complete search history.

(56) References Cited

U.S. PATENT DOCUMENTS

| | | | |
|---|---|---|---|
| 7,464,426 B2 | 12/2008 | Lee et al. | |
| 8,678,025 B2 | 3/2014 | Kitt | |
| 2011/0010279 A1* | 1/2011 | Tuttle | G06Q 10/06 705/30 |
| 2011/0295706 A1* | 12/2011 | Urquhart | G06Q 20/10 705/16 |
| 2017/0082991 A1* | 3/2017 | Belveal | H04W 4/70 |
| 2018/0173175 A1* | 6/2018 | Zhang | G07F 17/20 |

\* cited by examiner

*Primary Examiner* — Mark S Rushing

(57) ABSTRACT

A system for controlling washing and drying laundry machines, dispensing laundry products, collecting and remitting payments for laundry washing machine use, laundry drying machine use, monitoring location user base sales of laundry products from a dispenser, collecting diagnostic data from laundry machines, clearing laundry machine error codes, displaying advertisements, and scheduling repair visits, as well as an operating method therefor is disclosed, in which remote communication devices, such as cell phones, key fobs, other near field communication devices, or touch-screen kiosks, act on washing machines, dryer and product dispensers.

6 Claims, 5 Drawing Sheets

REMOTE CONTROLLED WASHER, DRYER, LAUNDRY PRODUCT DISPENSER AND PAYMENT SYSTEM AND OPERATING METHOD THEREOF

BACKGROUND OF THE INVENTION

Field of the Invention

The present disclosure relates to a clothing laundry system and a control method thereof enabling remote control of said system for operating laundry washing machines, laundry drying machines, and laundry products dispensing and vending machines, monitoring and advertising from a communication device, as well as collecting and remitting payments associated with the use of said system.

Background

People use a variety of appliances to launder clothing. For instance, an automated washer and dryer enable a person to launder clothing safely and conveniently.

Existing prior art allows users to watch progress with an Internet application which allows the monitoring of washer and dryer cycles and settings, download custom specialty cycles and receive alerts when clothes have not been removed. More particularly, prior art such as the General Electric laundry app, allow users to: monitor cycle status and time remaining, extend the dryer cycle, receive an alert when a cycle has finished, but the door has not been opened, download custom specialty cycles and monitor levels of tanks located in the machine which is being monitored. These machines are designed for use by a single house hold. They do not easily allow unrelated parties to share laundry machines. Additionally, prior art requires a Wi-Fi communication card to be built into the appliance allowing it to communicate with a communication device, such as a Smartphone for remote monitoring, control and notifications. Thus, another short coming of the prior art is the requirement for Wi-Fi, Bluetooth, Z-wave or other communication protocols.

Some people share said laundry appliances. For example, self-service laundry, such as Laundromats allow people to share laundry washing machines, laundry drying machines, and laundry products dispensing machine. More specifically, self-service laundry, coin laundry or coin wash is a facility where clothes are washed and dried.

Some laundries employ staff to provide service for the customers. Minimal service centers may simply provide an attendant behind a counter to provide change, sell washing powder, and watch unattended machines for potential theft of clothing. Others allow customers to drop off clothing to be washed, dried, and folded.

Prior art offers customers a variety of options for coinless and cashless laundry room payment systems. Shared laundry machines can be equipped with payment system addition is a wireless payment technology allowing residents to simply swipe a debit or credit card to pay at the washing machine or dryer in addition to coin or cash payment systems.

These systems allow users to use dedicated laundry payment card option. Said laundry payment cards allow users to add value to said card from machines located proximally to the shared laundry machines or go to the Internet to add more value to their laundry payment card using their credit card or bank ATM debit card.

More specifically, some laundry machines (option 1) are outfitted with a coin mechanism to accept coin to pay for machines. Typically these laundry machines are paid for via coin by the end user.

Some laundry machines (option 2) are outfitted with a card reader. End user goes to VTM (Value Transfer Machine) and adds via (one or a combination of the following) cash, credit card or purchase a code online and add to the card, purchase online and funds appear on card). User also has to purchase a card to add value to.

Some laundry machines (option 3) are each connected with a credit card swipe reader.

Some laundry machines (option 4) are outfitted with an offline dongle and connected via app or central controller in the room.

Some laundry machines (option 5) are outfitted with online dongle and connected via app some of these systems work with persistent connections The selection of a payment system for a laundry room is based on numerous decisions including the demographics of the customers that will use the equipment (are the users tech savvy (APP), do users have credit cards (cash/coin users), how many machines are in the room, what is the usage of the room is expected to be, what is the existing payment system (traditionally payment systems are very expensive and don't allow you to change credit card processor)

Shared laundry facilities have several shortcomings, including: inconvenience to the user due to the need of carrying coins, dollars, payment cards; risk to property due to third parties attempting to take money on premise from machines or users. Other short comings include lack of information as to the identity of the users, the use patterns of the facility and the ability to change user's use of the shared laundry facility. The applications which allow the remote control and monitor of a laundry washing machine or a laundry drying match from a smart phone application rely on Wi-Fi, Bluetooth, Z-wave or other communications protocol.

All of the five prior art options noted above include payment systems. None of the five prior art options help with any more of the business aspects of the laundry self service business than payment collection. The present invention does do more than act as a payment collection system.

The five most common prior art options each have specific short comings. More specifically, Option 1: Laundry Machines are outfitted with a coin mechanism to accept coin to pay for machines. Its shortcomings include: users need coins to do laundry; operator has no diagnostic/analytics on machines; and no ability to up-sell products.

Option 2: Laundry Machines are outfitted with a card reader. End user goes to VTM (Value Transfer Machine and adds via (one or a combination of the following) cash, credit card, purchase a code online and add to the card, or purchase code online and the funds appear on the card.

Its shortcomings include: user needs cash, credit card, or to buy codes online, and does not include real-time diagnostics.

Option 3: Laundry machines are each connected with a credit card swipe reader, and cannot use cash.

Its shortcomings include: user cannot see usage of machines or get notifications when machines are complete, and it is expensive for the operator to pay for swipes, and it is confusing to the user on his or her credit-card bill.

Option 4: Laundry Machines are each connected with a offline dongle and connected via app or central controller in the room and Option 5: Laundry Machines are outfitted with online dongle and connected via app some of these systems work with a semi-persistent connection The short comings associated with options 4 and 5 are associated with the fact that these options either capture the unique user information if the user uses the 'technology' or the users are anonymous if they don't use the technology and use coin/cash/card.

The present invention overcomes these shortcomings by eliminating the need for coins, dollars, payment cards as well as the risk to property due to third parties attempting to take money on premise from machines or users. More particularly, the present invention gives the operator the knowledge he needs to increase the life of the machines by "rotating the tires". It should be noted that swapping the position of the machine with 1000 turns with the position of the machine with 400 turns will result in better use of the machines. The present invention allows monitoring of machine use, display of cycle recommendations, rotation of machine position in laundry room to balance usage and, hence, extend machine life for a particular set of machines. This is done by comparing individual use cycles of particular machines with the average utilization of such machines, and moving high-use machines further from the laundry-room entrance (or other high-use location), for example.

Additionally, the present invention integrates the actual manufacturer payment protocol so we can update pricing, read diagnostic messages and inform the correct parties of what actions need to be taken versus payment systems that just use pulse and simulate a coin.

Thus, the present invention adds convenience and security, and thereby offers significant benefits over traditional coin-operated washers and dryers. The present invention provides shared laundry facility owners and operators information as to the use of said shared laundry facilities. Such information can improve a cashless laundry facility use by allowing said owner and operators to offer off peak pricing and maximize total revenue; increase user loyalty by offering an award program. Improve user satisfaction by informing users of facility availability so as to avoid unnecessary trips to the laundry facility. The present invention also enables the ability to optimize the use and investment in a laundry room while removing cash and value cards from the property. The present invention allows the direct movement of user payments to third parties, thus eliminating the need and cost of credit cards. The present invention does not need Wi-Fi to operate, though Wi-Fi, Bluetooth, or other protocol communications may be used.

More specifically, the present invention allows for seamless universal interaction for end users, installers, service technicians, customer service, salespeople, business owners, manufacturers, to interact with the business at large of any size from one washer and one dryer to a million or more laundry machines.

The present invention allows a user to know the best time of day to do laundry. Thus overcoming prior art short comings options associated with customer dissatisfaction associated with unavailability of shared laundry facilities upon arrival at said shared laundry facilities. The present invention also allows operators to know which set of users (e.g., residents in a building) are using the laundry facilities and which are not. This done by comparing a list provided by the facility owner with a list of information provided by the a communication device 200. This information may be used to market to non-users of the present invention.

The present invention allows yield management pricing engine to change the prices of laundry based on time of day (surge pricing) based on what the actual usage is. Thus overcoming prior art option short comings associated failing to charge the best price at the best time. The present invention determines the pricing surges.

The present invention allows better management of a laundry facility based on user demographics. None of the prior art options provide information to help provide better laundry facilities because the user demographics are different by location.

The present invention overcomes the prior art options use of different payment systems and devices are needed for each machine and each brand by have a universally accepted system.

For offline dongle, when the machines are not online then you do not get real time statistics and diagnostic messages. The present invention allows for real time statistics.

Existing prior art does not keep track of users in any detail. Regardless of whether a customer is adding funds with cash or a credit card, the present invention keep track of their unique profile.

Unlike some of the prior art options. the present invention: ameliorates or eliminates the theft of coin and cash; ameliorates or eliminates difficulty associated with the reconciling of credit card accounts; improves the serving of laundry machines by informing service providers which parts to bring; improves information about the use of laundry machines by sending information back to manufacturers regarding use; and informing laundry machine users as to the proper operation of laundry machines when they are not using the machines properly, which is the cause of 95% of user satisfaction issues.

The present invention is able to detect which type of laundry machine is used by connecting a different cable to a universal device that works across manufacturer product lines. This overcomes a short coming of the prior art of needing different devices to communicate with laundry machines produced by different manufactures. The present invention can also communicate with manufacturers' laundry machines directly.

The present invention can include laundry machine chemical dispensers (soap, bleach, softener). This capability is not generally available by current art options. Currently the user needs to leave the laundry room to purchase soap, bleach and softener. This process requires leaving the house, going to the store and making a purchase. In short, the current invention allows a more convenient laundry experience.

In sum, the present invention overcomes the short comings of the prior art by; providing real time information; providing service independent of the Internet; providing bank reconciliations; optionally enabling the operator of the present invention to accept cash, check/offline adding, credit and any other form of payment available from a third party; providing a loyalty program; providing targeted local advertising where advertisers can target specific apartments in a building (for example all 2 bedrooms or 3 bedrooms); providing present invention operators and uses options as to what information is exchanged and how information is exchanged; providing payment authorization key fob, cell phone, or by hand at kiosk; providing for a variety of connections to laundry machine via Wi-Fi, RFID (radio-frequency identification), Bluetooth, with or without a touch screen kiosk, with computer, depending on the operator's requirements; providing communication options including direct to device or via aggregating kiosk/CPU with touch screen or without and providing laundry chemical dispensing communication systems, such as counting the amount of loads a user does and prompt the user when it's time to order more product or offering soap injection so the user will be able to purchase product at the point of sale that will be automatically injected into the wash/dry cycles and the user will not have to ever buy and store bottles of product again. A dryer keeps running because it senses humidity above a preset level.

PRIOR ART

The following publications relate to systems and methods for remotely controlling an operation such as addressed by the current invention.

U.S. Pat. No. Title
U.S. Pat. No. 8,678,025 Method and apparatus for controlling fluid pressure
U.S. Pat. No. 7,464,426 Internet-washer and operating method thereof The prior art has laundry-machine controllers which can control a single machine, and laundry machine controllers which can handle a plurality of machines from the same manufacturer, but the prior art does not contain any controllers which can handle multiple machines from multiple manufacturers. This shortcoming is not a software issue but, rather, a cabling issue.

None of the foregoing, however teaches the combination of user control, laundry machine management, payment options, and machine maintenance with standard laundry services. Therefore, a better process of remotely controlling a laundry operation is desirable which surmounts the limitations of the prior art.

SUMMARY OF THE INVENTION

The present invention is a system for washing laundry, drying laundry, dispensing laundry products, and collecting and remitting payments for laundry washing machine use, laundry drying machine use, and sales of laundry products from a dispenser, as well as an operating method thereof, in which remote communication devices, such as cell phones, act on washing machines, dryer and product dispensers. Additionally, the present invention may collect diagnostic data from laundry machines, resets laundry machine error codes, displays advertisements, and may schedule repair visits.

It should be noted that the present invention is capable of scheduling servicing equipment, and other functions are available without the need to disassemble the piece of equipment, these can be performed remotely and on site. The present invention is capable of over the air re-boot, update, download, price change, modifying programs. A variety of other functions are made available such as the ability to add credit with cash, check or credit by the current invention.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED SPECIFICATION AND METHOD OF USE

The present invention is composed of five elements, including a communication device 200, a laundry machine controller 300, a laundry machine controller connector (not shown) to a laundry machine 100 and a third party payer communication device 400. Said communication device 200, such as a smart phone is capable of sending at least two messages to and receiving at least one message from said laundry machine controller 300. The laundry-machine controller connector is required for the present invention. Said connector can be incorporated by the manufacturer or an existing cable. Alternatively, the connector may be a wireless communications element such as a chip in lieu of a cable (e.g., via Wi-Fi or Bluetooth). Said connector must be capable of transmitting laundry-machine 100 data to laundry-machine controller 300 in such a format as to allow laundry-machine controller 300 to read it.

The specifications of the connector are protocol-specific to a manufacturer or even by model by the same manufacturer. Acquiring said protocols may be achieved by working directly with manufacturers of new equipment or reprogramming laundry machine 100 to use protocols usable by laundry-machine controller 300.

Said laundry machine controller 300 is capable of receiving at least two messages from said communication device 200, sending at least one message to said communication device 200, receiving at least one message from a laundry machine 100, using said message to update a log of said laundry machine 100 use history; sending at least one message to said laundry machine 100, and sending a message to a third party willing to transfer funds on behalf of the user of said communication device 200. Said laundry machine 100 is capable of sending a message to said laundry machine controller 300 and of receiving a message from said laundry machine controller 300.

Said third party payer communication device 400 is capable of receiving at least one message from said laundry machine controller 300.

The present invention uses a set of cables which are uniquely associated with the laundry machine 100 as needed due to laundry machine 100 specifications by manufacturer. The present invention may push updates to software or firmware in either laundry machine 100 or laundry machine controller 300 over-the-air using Wi-Fi, Bluetooth, Z-wave or other communications protocols.

The present invention method may be initiated by laundry machine 100 or by laundry machine controller 300 using an internal clock or timing mechanism.

In an alternative embodiment, the database in laundry machine 100 may instead be employed in laundry machine controller 300, or even a remote location (not shown). Communications from laundry machine 100 to communications device 200 could alternatively originate in laundry machine controller 300.

Figure 1:
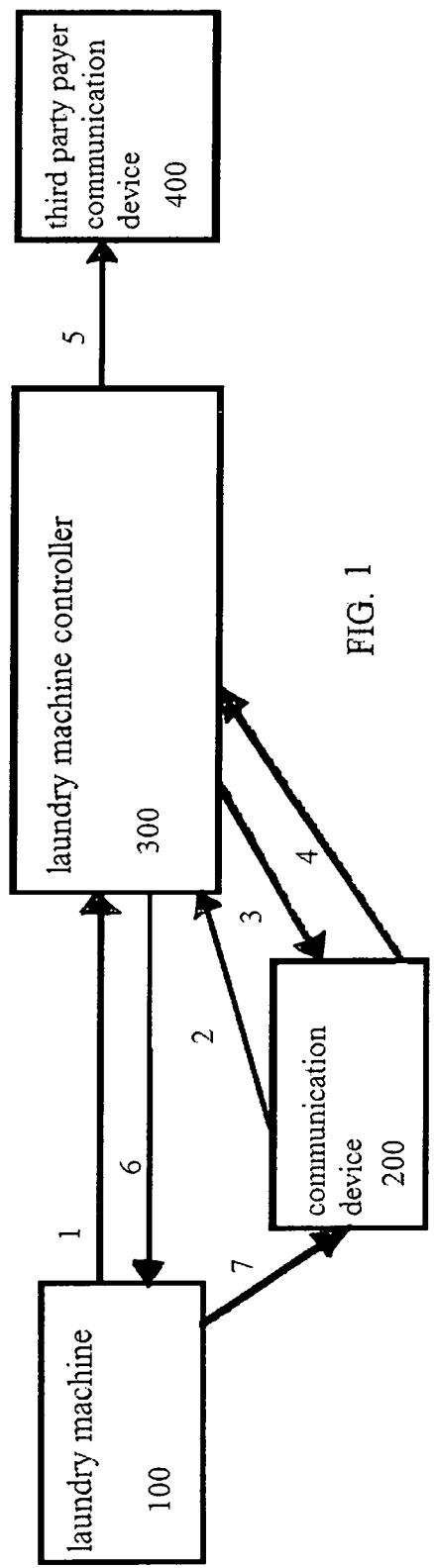
FIG. 1 illustrates schematically a block diagram of the elements according to the present invention.
Figure 2:
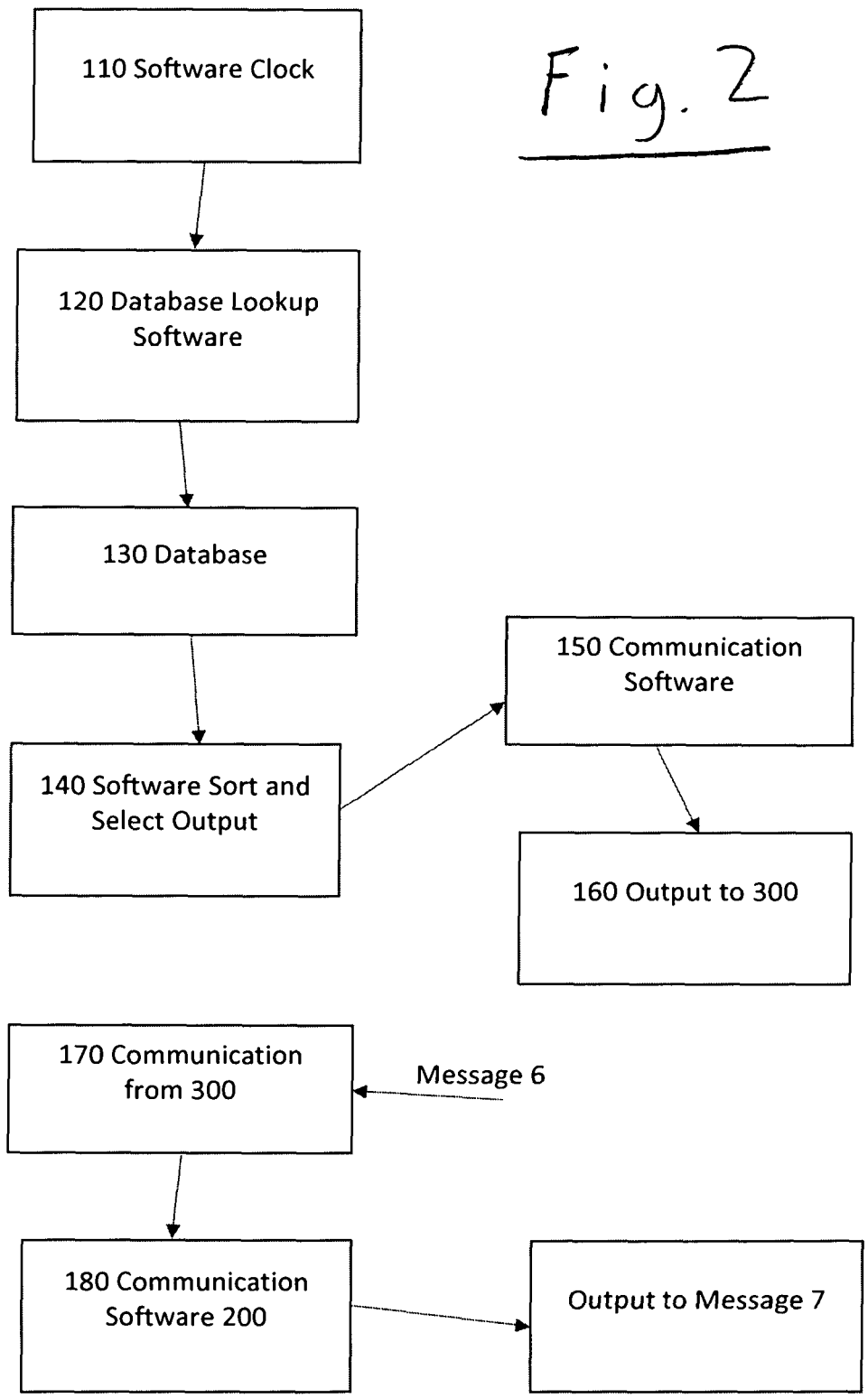
FIG. 2 illustrates a flowchart of a method of controlling the software elements of laundry machine 100 according to a preferred embodiment of the present invention.

With respect to FIG. 2, laundry machine 100 in the preferred embodiment runs a series of programs. The first is software clock 110 which at specified times initiates database lookup software 120. Database 130, having been accessed, initiates sort-and-select output routine 140 to output the desired data through communications software 150 through the output module 160 to laundry machine controller 300. Conversely, incoming message six routes through communications module 170 to communication software 180 for transmission in the appropriate format to communications device 200 via message seven.

Steps 120, 130, 140, 150 and 160, alternatively, may occur within the laundry machine controller 300.

Figure 3:
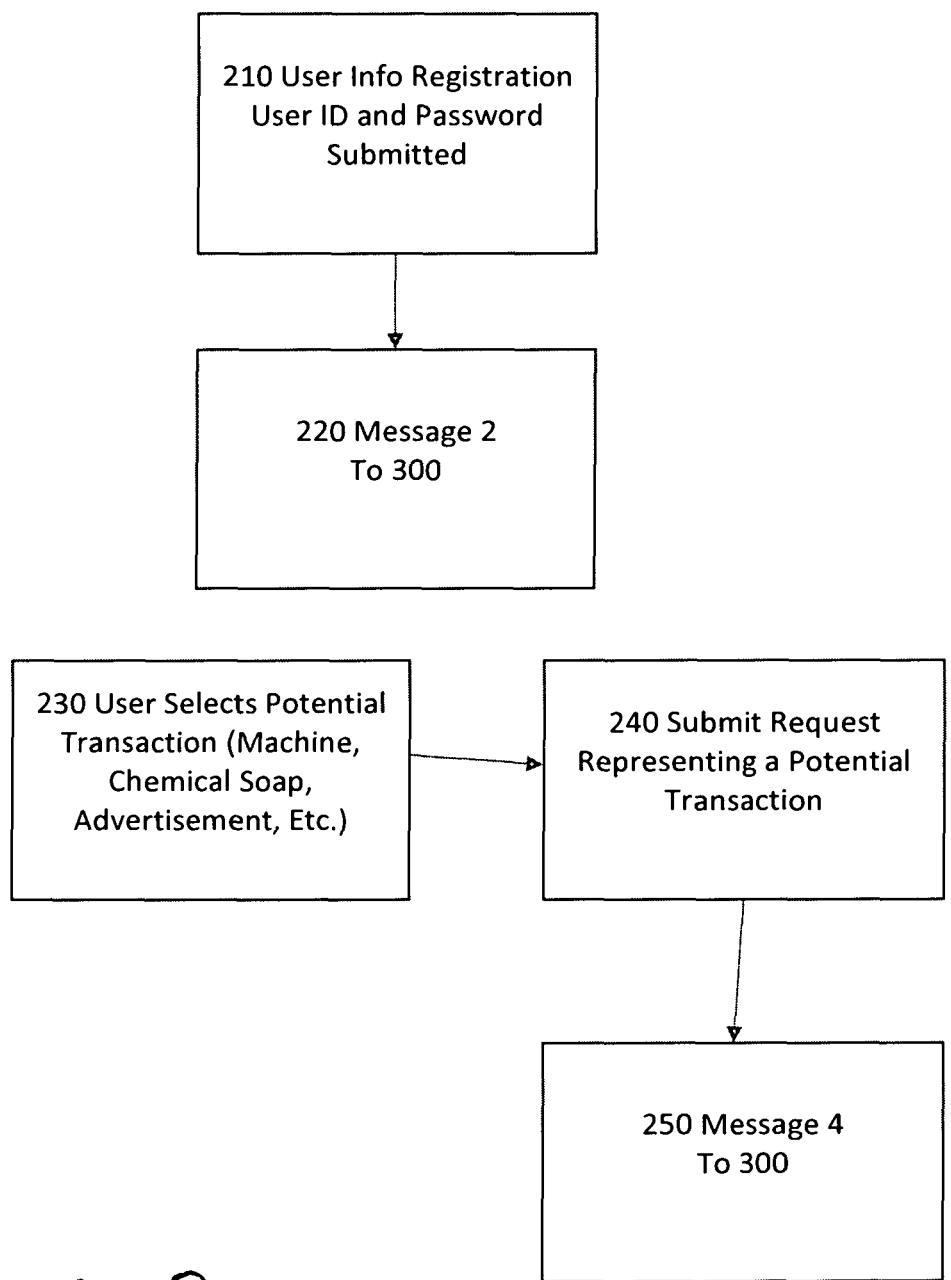
FIG. 3 illustrates a flowchart of the software elements of the communications device 200 according to a preferred embodiment of the present invention.

Referring now to FIG. 3, user registration and validation data are processed through module 210 for transmission in the appropriate format as message two to laundry machine controller 300. The desired laundry transaction (e.g., washer, dryer, dispenser, advertising) is selected in module 230, then submitted as a potential transaction via module 240 for transmission in the appropriate format via module 250 as message four to laundry machine controller 300.

Figure 4:
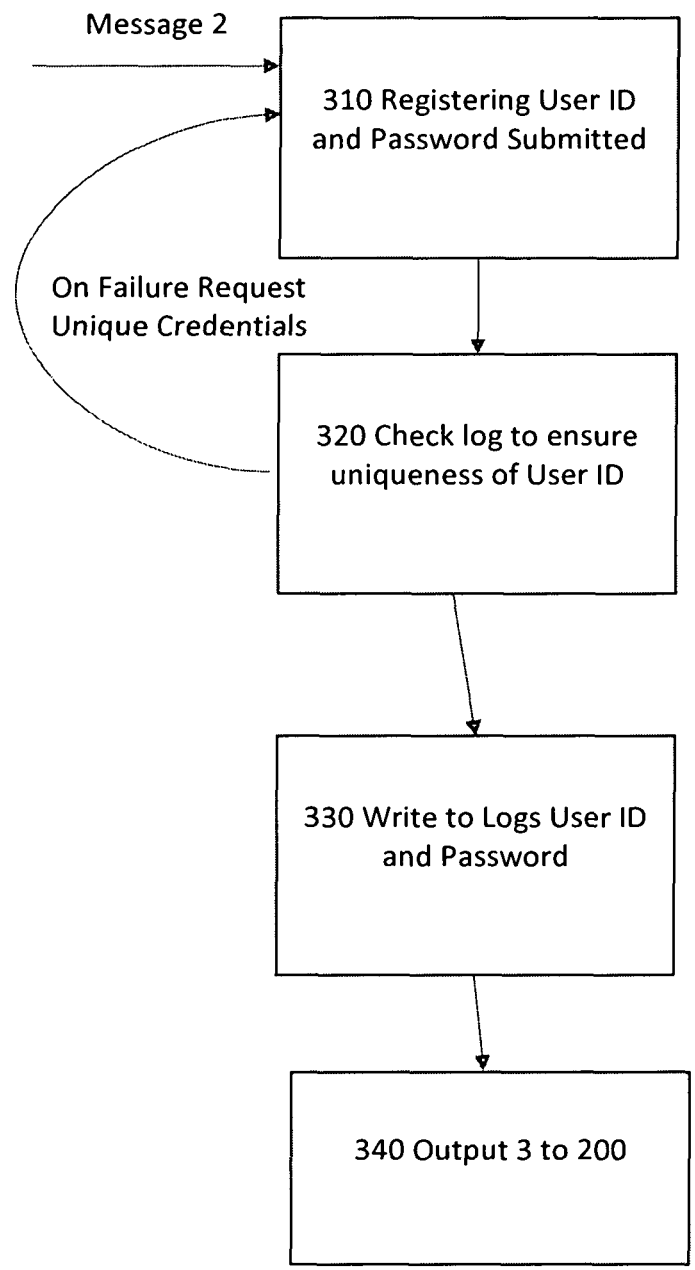
FIG. 4 illustrates a flowchart of the software elements of the laundry machine controller 300 according to a preferred embodiment of the present invention.

Referring now to FIG. 4, in response to said message two, module 310 registers the user ID and password which were submitted and initiates module 320, and upon failure to establish unique credentials, module 320 reinitiates module 310 for validation and possible challenge for re-entry. Otherwise, modules 320 initiates module 330 to log the user ID and password for the session, then initiates module 340 to output message 3 in the appropriate format to communications device 200.

Figure 5:
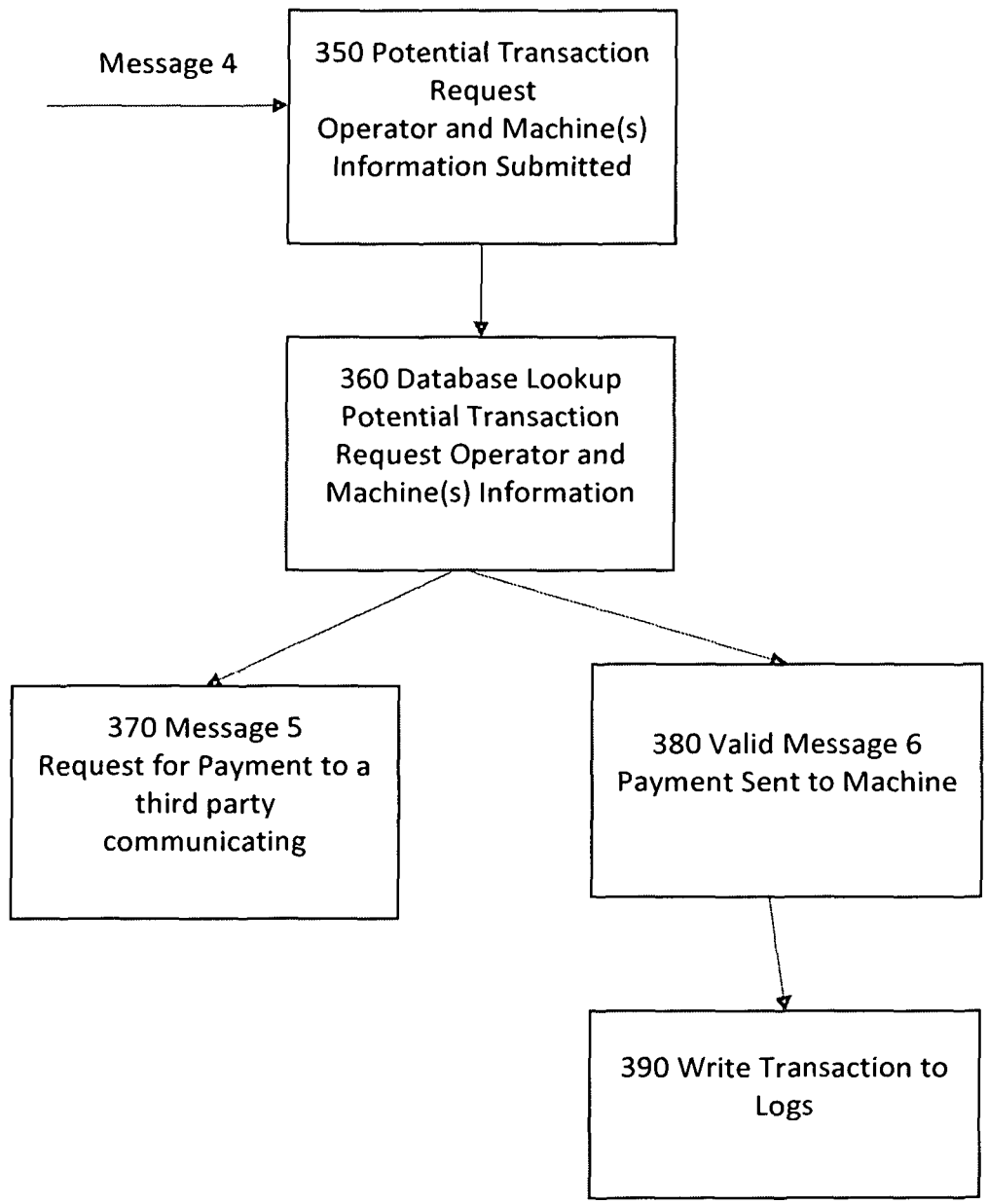
FIG. 5 illustrates the software elements executed in response to Message 4.

Referring now to FIG. 5, in response to said message four, module 350 registers the potential transaction request for the operator and machine based upon the information submitted. Next, module 360 is initiated to look up the requested transaction and obtain operator and laundry-machine information. Payment request message 5 is initiated to the appropriate third-party application or processor. If payment is authorized, module 380 generates said message six to the desired laundry machine 100, and initiates module 390 for logging of the transaction.

Communications device 200 functions may alternatively be incorporated into a kiosk touch-screen or RFID-type device for users not having a smart-phone, tablet or other application-processing device.

The present invention is capable of providing machine diagnostics, sending messages and advertising on mobile devices such as communication device 200, on Kiosks and on laundry machines and to end users, collecting demographics, user patterns, day, date and time of usage, selling additional services and services such as using a moisture sensor, employing a Dry-Until-Finished feature that keeps adding funds to the dryer to keep drying clothes until the clothes are fully dried as detected by the humidity sensor. These features are implemented by comparing information stored in laundry machine controller 300 with information supplied laundry machine 100 and communication device 200.

The present invention is used according to the following steps:

sending a message one from a laundry machine 100 to a laundry control machine said message one communicates the operational status of said laundry machine 100;

updating a log associated with said laundry machine 100, said log located in laundry machine controller 300 upon receipt of said message one;

creating a report associated with said log's update upon the execution of said updating;

communicating said report to an operator of said laundry machine controller 300;

sending a message two from a communication device 200, such as a smart phone to said control machine whereby said message two communicates said communication device 200's user's information, such as a user name and a funds transfer authorization, such as a credit card authorization benefiting an operator of said laundry machine controller 300;

building a user log in said laundry machine controller 300 upon receipt of said message two containing information from said message two;

generating a user id and a user password associated with said user log upon said generation;

adding said user id and said password to said user log;

sending a message three from said laundry machine controller 300 to said communication device 200 whereby said communication device 200 stores said password and said id;

sending a message four from said communication device 200 to said laundry machine controller 300 communicating the identity of said laundry machine 100 and authorization for said operator of laundry machine controller 300 to transfer funds;

sending a message five from said laundry machine controller 300 to a third party communicating request for payment of funds to said operator of said laundry machine controller 300;

sending a message six from said laundry machine controller 300 to said identified laundry machine 100 communicating authorization to operate;

signaling a message seven from said laundry machine 100 to operator of said communication device 200 communicating authorization to operate said laundry machine 100.

While laundry machine 100 can be a standalone device, it may also house other device elements of the present invention. For example, laundry machine 100 may enclose laundry machine controller 300. Alternatively, laundry machine 100 may enclose communication device 200, or third-party communication device 400, or a combination thereof. In fact, laundry machine 100 may contain all elements: communication device 200, laundry machine controller 300, and third-party communication device 400.

Additional communications may facilitate optional features of the present invention. For example, a communication from said laundry machine 100 to a manufacturer of said laundry machine 100 will facilitate use feed back to said manufacturer of said laundry machine 100 and service of said laundry machines 100. Communication from said laundry machine controller 300 to said user will facilitate up-selling, loyalty programs, and targeted advertising. Communication from said laundry machine controller 300 to said operators of said laundry machines 100 will facilitate balancing use of said laundry machines 100, and collecting information about said user.

Laundry machine 100 can be a single machine of one type (e.g., a washer-dryer with a built-in detergent dispenser), a plurality of similar machines (e.g., a set of dryers by the same manufacturer), or a plurality of different machines (e.g., three dryers by manufacturer "A", a washing machine from manufacturer "B", and a detergent dispenser from manufacturer "C"). The present invention's laundry-machine controller 300 is capable of controlling multiple machines from multiple manufacturers simultaneously.

In addition to the software described by the present invention, laundry machine 100 has software from the laundry machine manufacturer. Such software is capable of diagnosing laundry-machine maintenance issues, and communicating said issues to the present invention. Said laundry machine 100 has software which allows said laundry machine 100 to operate as designed. For example, said laundry machine 100 might be a dryer which contains a humidity sensor. Said laundry machine 100 is capable of determining the humidity in laundry machine 100 referencing optimal drying times and shutting off the dryer when such times are reached. The present invention contains software which allows laundry machine 100 to communicate to communications device 200 via message seven that the laundry is dried. Alternatively, laundry machine 100 may communicate via message seven to communications device 200, an option to allow the user of communications device 200 to continue to authorize payment until laundry machine 100 determines that the drying is complete.

Communications device 200 can be a cell phone, a front panel of laundry machine 100. Communications device 200 can be incorporated into laundry machine controller 300. Communications device 200 is designed to communicate present invention's user's intent to use the present invention. Communications device 200 is designed to communicate to laundry machine controller 300, which one of a plurality of laundry machines 100 that the present invention's user would like to use. Communications device 200 is also designed to accept messages from laundry machine 100 and laundry machine controller 300, such messages would include, but not be limited to, when laundry machine 100 is available. When laundry machine 100 has completed the operation requested by communications device 200, using message four, advertisements sent by laundry machine controller 300 directly to communications device 200 via message three, or advertisements sent from laundry machine 100 via message seven to communications device 200.

I claim:

1. A method using a laundry system comprising a laundry machine; a communication device; a laundry machine controller, a third party payer communication device and a laundry-machine controller connector, according to the following steps:
   a) sending a message one from said laundry machine to said laundry machine controller, said message one communicates the operational status of said laundry machine;
   b) updating a log associated with said laundry machine, said log located in laundry machine controller upon receipt of said message one;
   c) creating a report associated with said log's update upon the execution of said update;
   d) communicating said report to an operator of said laundry machine controller;
   e) sending a message two from a communication device, to said laundry machine controller, whereby said message two communicates said communication device's user name and a funds transfer authorization benefiting an operator of said laundry machine controller;
   f) building a user log in said laundry machine controller upon receipt of said message two containing information from said message two;
   g) generating a user id and a user password associated with said user log upon said generation;
   h) adding said user id and said password to said user log;
   i) sending a message three from said laundry machine controller to said communication device whereby said communication device stores said password and said user id;
   j) sending a message four from said communication device to said laundry machine controller communicating the identity of said laundry machine and authorization for said operator of laundry machine controller to transfer funds;
   k) sending a message five from said laundry machine controller to a third party communicating request for payment of funds to said operator of said laundry machine controller;
   l) sending a message six from said laundry machine controller to said identified laundry machine communicating authorization to operate;
   m) signaling a message seven from said laundry machine to operator of said communication device communicating authorization to operate said laundry machine.

2. The method of claim 1, wherein said message one is initiated by said laundry machine controller and transmitted to said laundry machine.

3. The method of claim 1, wherein operations signaling said laundry machine controller are performed by said laundry machine.

4. The method of claim 1, wherein operations authorized by said third party payer communication device are performed by said laundry machine.

5. The method of claim 1, wherein operations authorized by said communication device are performed by said laundry machine.

6. The method of claim 1, wherein said funds transfer operation comprises a credit card authorization.

* * * * *